(12) United States Patent
Nakamura et al.

(10) Patent No.: US 12,506,310 B2
(45) Date of Patent: Dec. 23, 2025

(54) ROTATING CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Yuto Nakamura, Tokyo (JP); Kaoru Sugimoto, Tokyo (JP); Naoyuki Kojima, Tokyo (JP); Yoshiyuki Suzuki, Inukami-gun (JP); Masaya Araki, Inukami-gun (JP); Yuka Sawada, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 301 days.

(21) Appl. No.: 18/324,293

(22) Filed: May 26, 2023

(65) Prior Publication Data

US 2023/0307880 A1    Sep. 28, 2023

Related U.S. Application Data

(63) Continuation of application No. PCT/JP2021/042564, filed on Nov. 19, 2021.

(30) Foreign Application Priority Data

Dec. 15, 2020   (JP) ................................ 2020-207887

(51) Int. Cl.
*B60R 16/027*   (2006.01)
*H01R 35/02*    (2006.01)
(Continued)

(52) U.S. Cl.
CPC ......... *H01R 35/025* (2013.01); *B60R 16/027* (2013.01); *H01R 35/04* (2013.01); *H01R 13/6473* (2013.01); *H01R 2201/26* (2013.01)

(58) Field of Classification Search
None
See application file for complete search history.

(56) References Cited

U.S. PATENT DOCUMENTS 6,969,807 B1    11/2005   Lin et al.
9,300,100 B2 *   3/2016   Abe ........................ H01R 35/04
(Continued)

FOREIGN PATENT DOCUMENTS

JP    2005-39870 A     2/2005
JP    2005-339833 A   12/2005
(Continued)

OTHER PUBLICATIONS

Extended European Search Report issued Mar. 20, 2024 in European Patent Application No. 21906258.5, 7 pages.
(Continued)

*Primary Examiner* — Tho D Ta
(74) *Attorney, Agent, or Firm* — Oblon, McClelland, Maier & Neustadt, L.L.P.

(57) ABSTRACT

Provided is a rotating connector device with which it is possible to suppress an increase in the size of the device, and to reliably suppress a decrease in electromagnetic compatibility due to electromagnetic noise and to stabilize characteristic impedance.

A rotating connector device 1 is provided with a fixed-side housing 10, a rotating-side housing 20 which is free to rotate relative to the fixed-side housing 10, and a plurality of flat cables 30 which are formed by covering conductors with an insulating material and which are accommodated in a stacked state in an annular accommodating space S formed (Continued)

between the fixed-side housing 10 and the rotating-side housing 20, wherein a shield film 35 is disposed at least between a first flat cable 31 including first and second communication circuit conductors 31*a*5, 31*a*6 and a second flat cable 32 adjacent to the first flat cable 31, among the plurality of flat cables 30.

7 Claims, 6 Drawing Sheets

(51) Int. Cl.
  *H01R 35/04* (2006.01)
  *H01R 13/6473* (2011.01)

(56) References Cited

U.S. PATENT DOCUMENTS

| | | |
|---|---|---|
| 2007/0193770 A1 | 8/2007 | Ueno et al. |
| 2015/0031219 A1 | 1/2015 | Abe et al. |
| 2015/0213924 A1 | 7/2015 | Chang |

FOREIGN PATENT DOCUMENTS

| | | | |
|---|---|---|---|
| JP | 2008-29179 A | 2/2008 | |
| JP | 2009-181804 | 8/2009 | |
| JP | 2015-201312 A | 11/2015 | |
| WO | WO 2011/136008 A1 | 11/2011 | |
| WO | WO 2014/017649 A1 | 1/2014 | |
| WO | WO-2016087305 A1 * | 6/2016 | ........... B60R 16/027 |

OTHER PUBLICATIONS

International Search Report issued Dec. 21, 2021 in PCT/JP2021/042564 filed on Nov. 19, 2021, 2 pages.
Notification of Reasons for Refusal issued Sep. 9, 2025 in Japanese Patent Application No. 2022-569802, with machine translation, 7 pages.

* cited by examiner

ROTATING CONNECTOR DEVICE

TECHNICAL FIELD

The present invention relates to a rotating connector device for use as a steering roll connector.

BACKGROUND ART

A rotating connector device has been conventionally known which is provided with a fixed-side member, a rotating-side member which is rotatable relative to the fixed-side member, and a plurality of flat cables which are each formed by covering conductors with an insulating material and which are accommodated in a stacked state in an annular accommodating space formed between the fixed-side member and the rotating-side member (for example, see Patent Document 1).

In a case where the rotating connector device is used for high-speed multiplex communication in, for example, a controller area network (CAN), the rotating connector device may have disadvantages such as a decrease in electromagnetic compatibility due to electromagnetic noise and destabilization of characteristic impedance of communication circuit conductors, and accordingly. Therefore, it is required for the rotating connector device to reduce the disadvantages.

Patent Document 1: PCT International Publication No. WO2014/017649

DISCLOSURE OF THE INVENTION

Problems to be Solved by the Invention

In the rotating connector device disclosed in Patent Document 1, the flat cables each having communication circuit conductors and dummy flat cables having no conductor are integrally formed so that each dummy flat cable is disposed between the adjacent flat cables having conductors, to thereby suppress a decrease in the electromagnetic compatibility due to electromagnetic noise and the destabilization of the characteristic impedance of the communication circuit conductors of the flat cables. Therefore, in the rotating connector device of Patent Document 1, the entirety of the plurality of flat cables has a large dimension in the thickness direction, which may cause an increase in the size of the device.

An object of the present invention is to provide a rotating connector device capable of improving electromagnetic compatibility and stabilizing characteristic impedance, while suppressing an increase in size of the device.

Means for Solving the Problems

A rotating connector device according to the present invention comprises a fixed-side member, a rotating-side member which is rotatable relative to the fixed-side member, and a plurality of flat cables which are each formed by covering conductors with an insulating material and which are accommodated in a stacked state in an annular accommodating space formed between the fixed-side member and the rotating-side member, wherein a shield film is disposed between at least a flat cable including target conductors and a flat cable adjacent to the flat cable including the target conductors that are selected from the plurality of flat cables.

In the rotating connector device according to the present invention, the shield film is formed integrally with the flat cable including the target conductors.

In the rotating connector device according to the present invention, the shield film is disposed on a portion in a width direction of the flat cable including the target conductors, where at least the target conductors are located.

In the rotating connector device according to the present invention, the shield film is formed integrally with one surface of each of the plurality of flat cables.

In the rotating connector device according to the present invention, the shield film is formed by vapor deposition of silver on a resin film.

Effects of the Invention

According to the present invention, a shield film makes it possible to stabilize characteristic impedance of target conductors even when the number of stacked layers of a plurality of flat cables changes in an accommodating space, which makes it possible to suppress an increase in size of a device, and to improve electromagnetic compatibility and stabilize characteristic impedance.

PREFERRED MODE FOR CARRYING OUT THE INVENTION

First Embodiment

Figure 1:
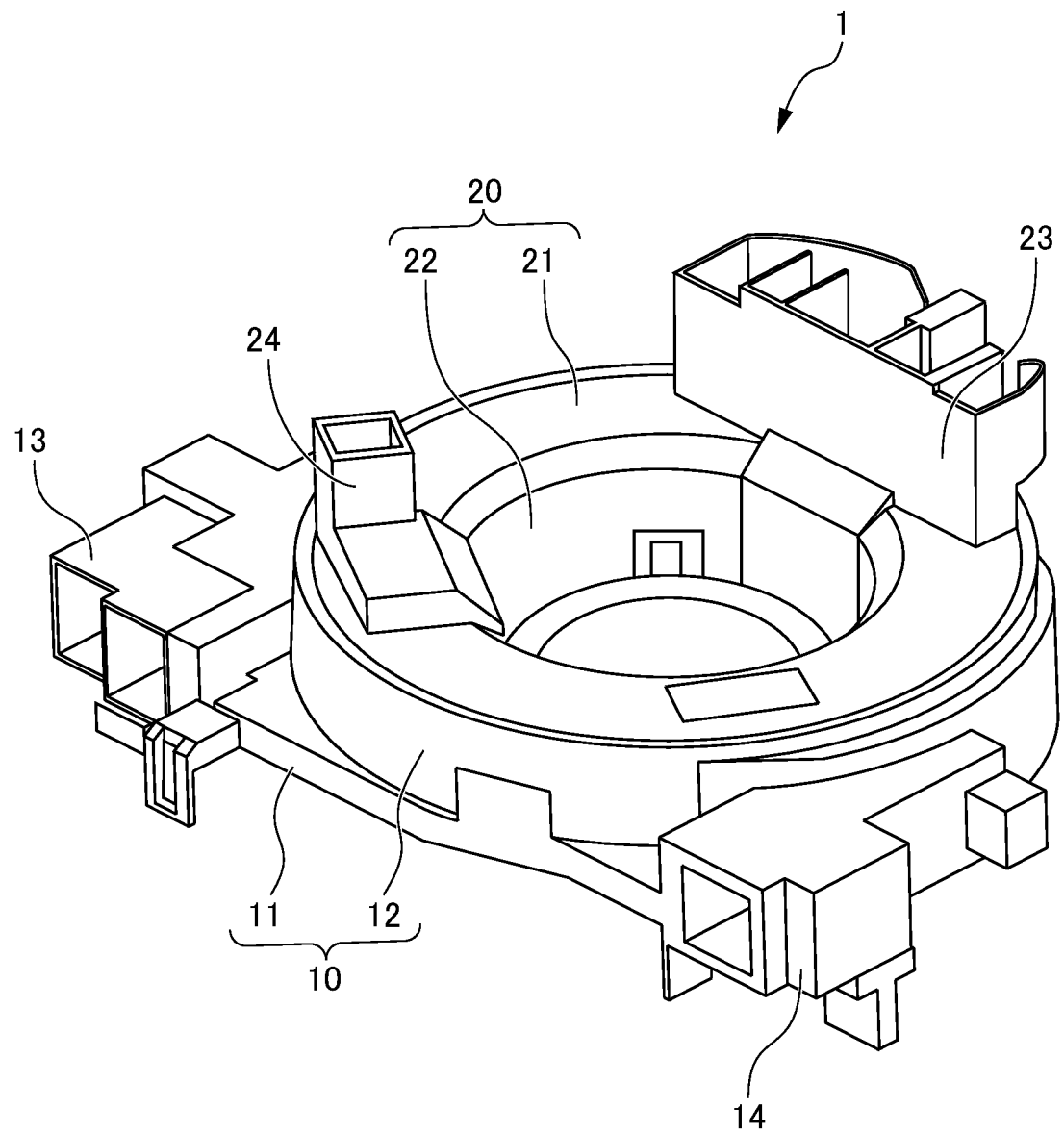
FIG. 1 is an overall perspective view of a rotating connector device according to a first embodiment of the present invention.
Figure 2:
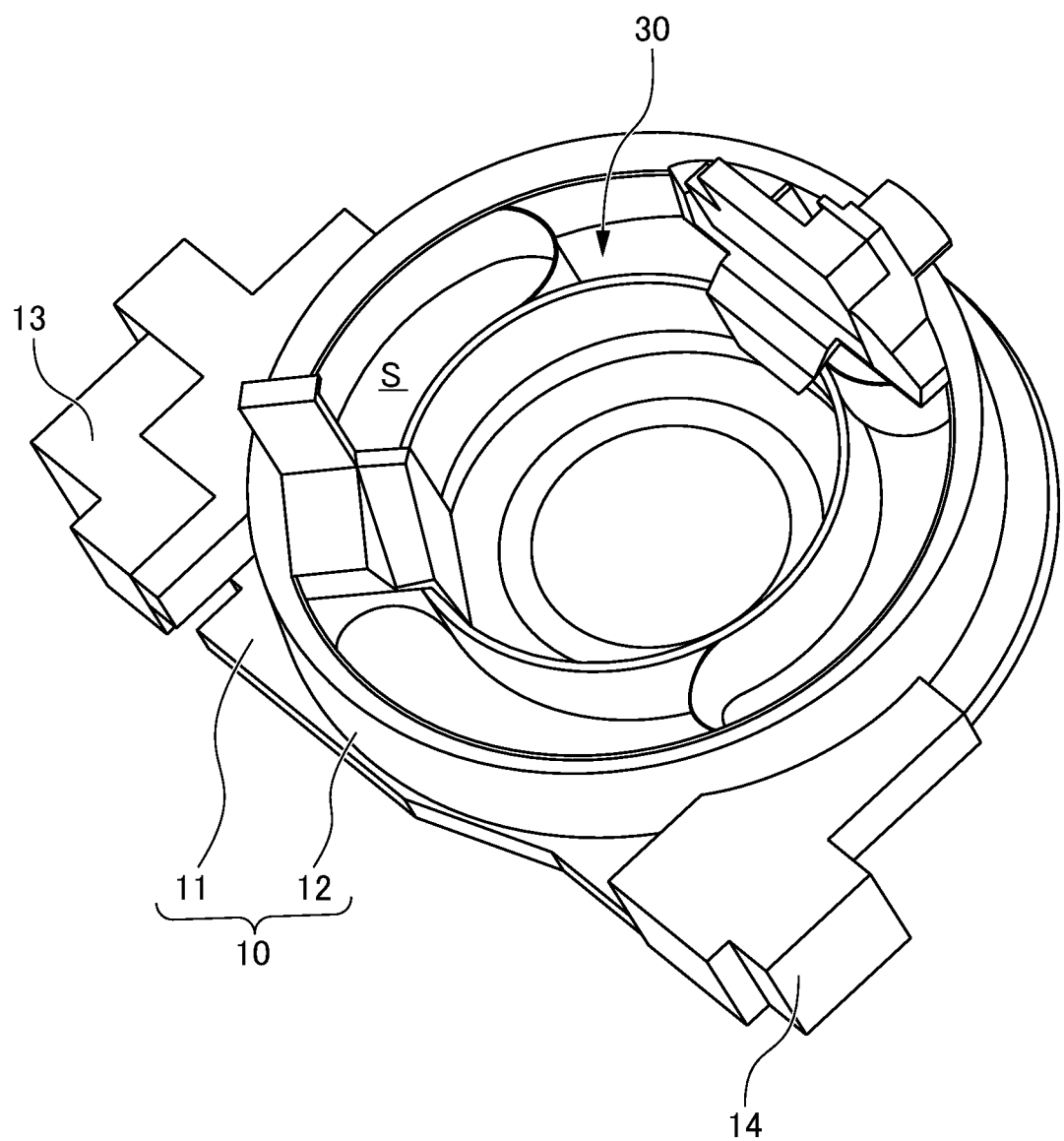
FIG. 2 is a perspective view illustrating an internal structure of the rotating connector device according to the first embodiment of the present invention.
Figure 3:
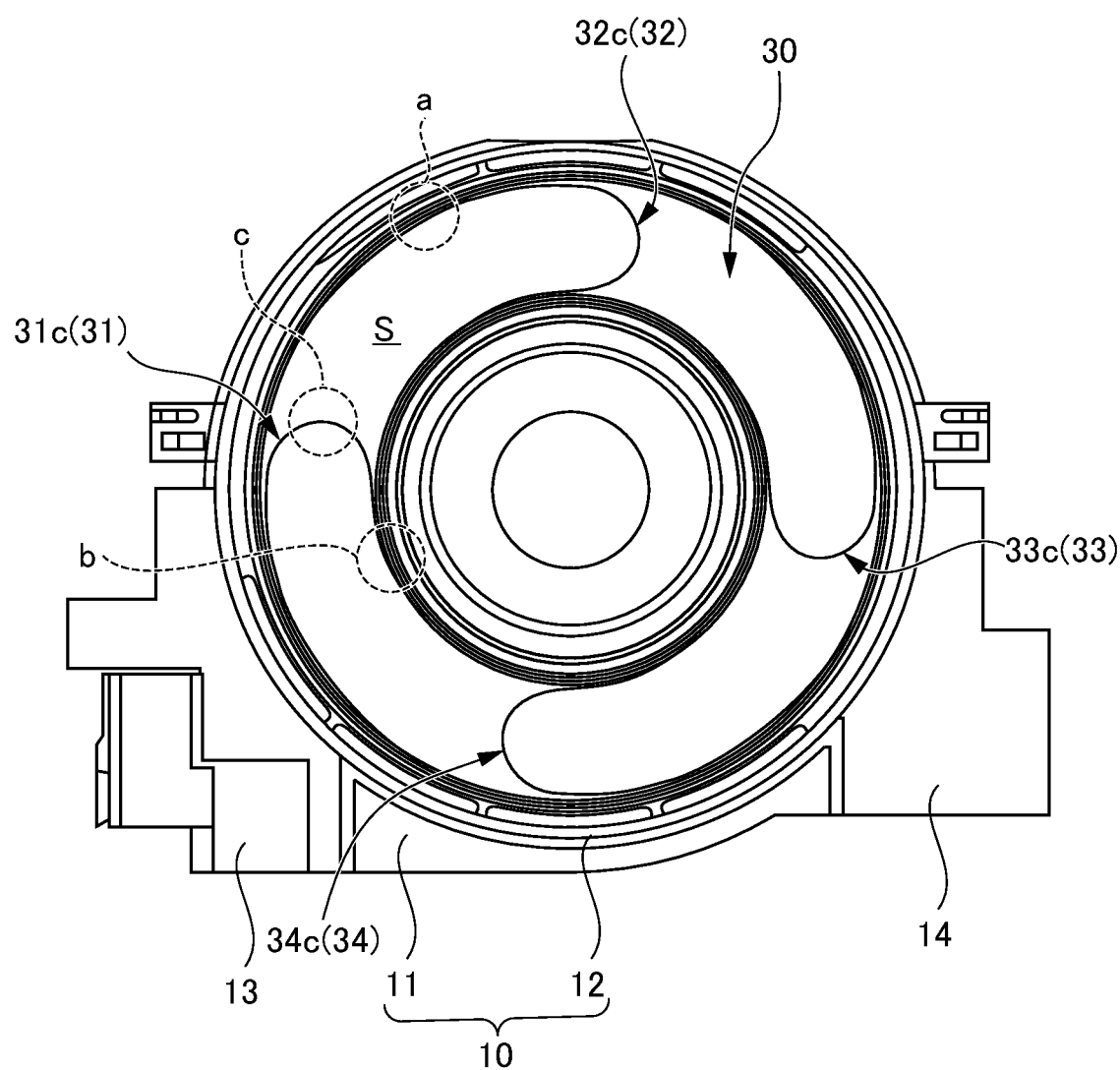
FIG. 3 is a planar view illustrating the internal structure of the rotating connector device according to the first embodiment of the present invention.
Figure 4:
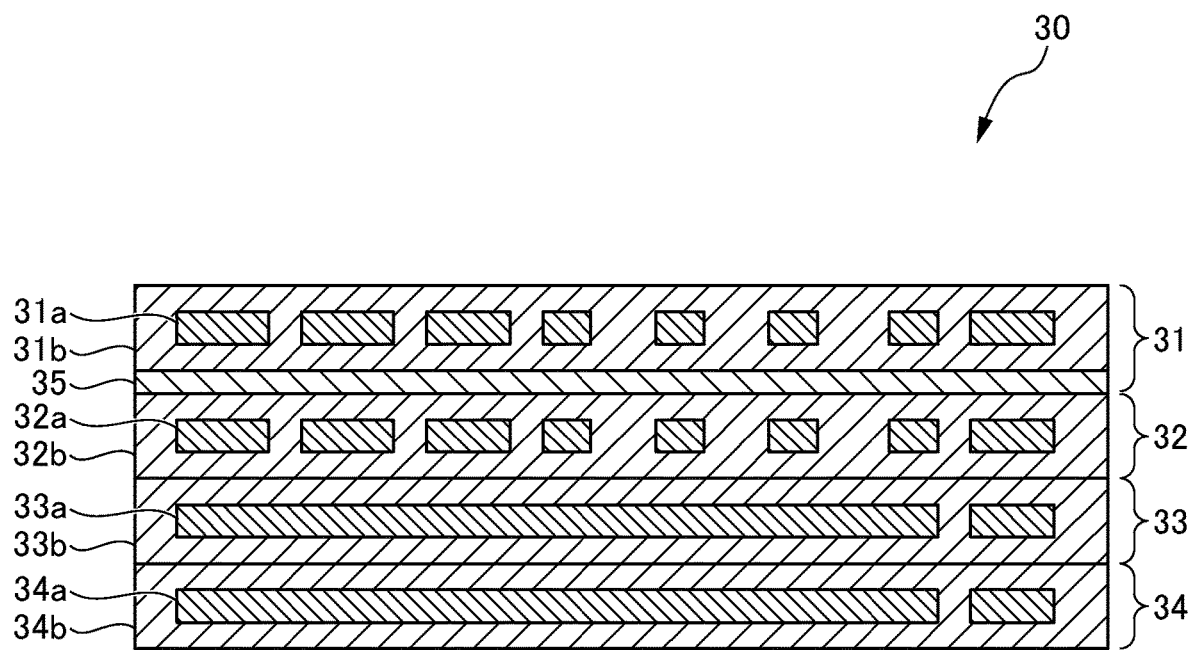
FIG. 4 is a cross-sectional view of first to fourth flat cables according to the first embodiment of the present invention.
Figure 5:
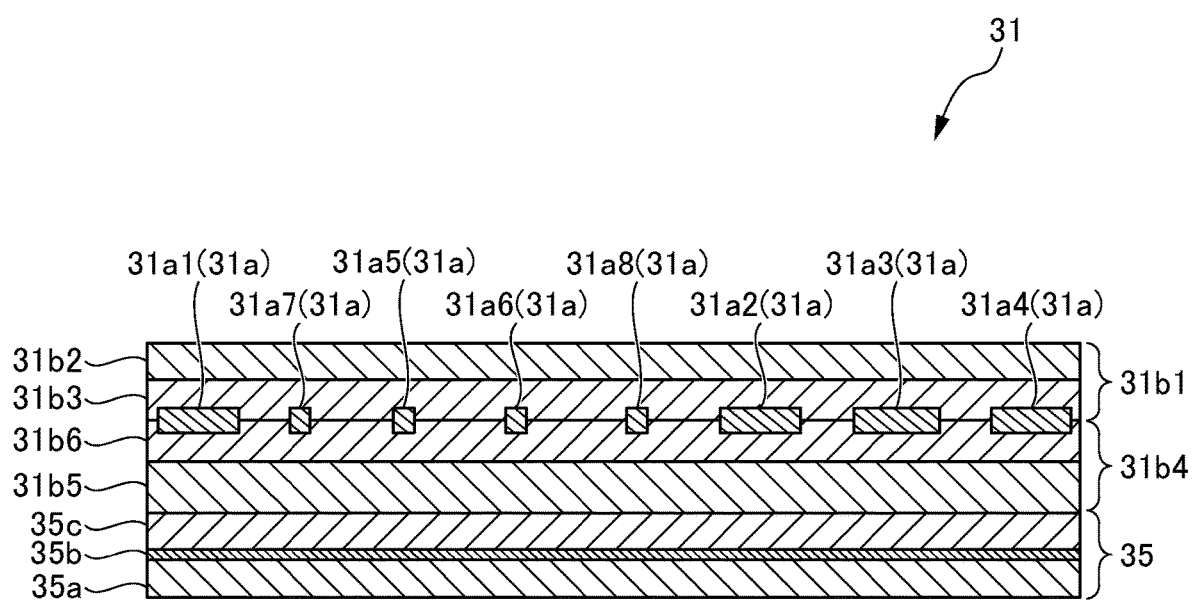
FIG. 5 is a cross-sectional view of the first flat cable according to the first embodiment of the present invention.

FIGS. 1 to 5 illustrate the first embodiment of the present invention. FIG. 1 is a perspective view of a rotating connector device according to a first embodiment of the present invention, FIG. 2 is a perspective view illustrating the interior of the rotating connector device, FIG. 3 is a planar view illustrating the interior of the rotating connector device, FIG. 4 is a cross-sectional view illustrating first to fourth flat cables in FIG. 3, and FIG. 5 is a cross-sectional view illustrating the first flat cable.

A rotating connector device 1 of the present embodiment is used as a so-called steering roll connector provided in a connecting portion between a steering column on a vehicle main body side and a steering shaft on a steering wheel side. The rotating connector device 1 forms a part of a communication circuit that transmits electrical signals between a main ECU provided on the vehicle main body side and a steering ECU provided on the steering wheel side and configured to control electric components disposed on the steering wheel side and that forms a part of other conductive circuits that transmit electric power and electrical signals between the vehicle main body side and the steering wheel side. Here, the communication circuit performs high-speed communication of 100 Mbps or more, for example.

As illustrated in FIG. 1, the rotating connector device 1 is provided with a fixed-side housing 10 serving as a fixed-side member which is fixed to the steering column, a rotating-side housing 20 serving as a rotating-side member which is fixed to the steering shaft and which is rotatable relative to the fixed-side housing 10, and a plurality of flat cables 30 which are accommodated in an annular accommodating space S formed between the fixed-side housing 10 and the rotating-side housing 20.

The fixed-side housing 10 includes a fixed-side ring part 11 in which an opening is provided so that the steering shaft can be inserted therethrough, and an outer circumferential cylindrical part 12 having a cylindrical shape and extending vertically from an outer circumferential side of the fixed-side ring part 11. An outer circumferential portion of the outer circumferential cylindrical part 12 is provided with a first fixed-side connector 13 to which one ends of some of the plurality of flat cables 30 are connected, and a second fixed-side connector 14 to which one ends of the other flat cables 30 are connected.

The rotating-side housing 20 includes a rotating-side ring part 21 which is disposed to face the fixed-side ring part 11 and in which an opening is provided so that the steering shaft can be inserted therethrough, and an inner circumferential cylindrical part 22 which is disposed to face the outer circumferential cylindrical part 12, and extends vertically from an inter circumferential side of the rotating-side ring part 21. An outer surface of the rotating-side ring part 21 is provided with a first rotating-side connector 23 to which the other ends of some flat cables 30 whose one ends are connected to the first fixed-side connector 13 are connected, and a second rotating-side connector 24 to which the other ends of the other flat cables 30 whose one ends are connected to the second fixed-side connector 14 are connected.

The accommodating space S is annularly formed by being defined by the fixed-side ring part 11 and the outer circumferential cylindrical part 12 in the fixed-side housing 10, and the rotating-side ring part 21 and the inner circumferential cylindrical part 22 in the rotating-side housing 20.

The plurality of flat cables 30 are each formed into a belt shape having the same width directional dimension. The plurality of flat cables 30 are formed separately, and are accommodated in the accommodating space S in a detachably stacked state. As illustrated in FIGS. 2 and 3, the plurality of flat cables 30 have respective one ends fixed to the outer circumferential cylindrical part 12 and are wound along the inner circumferential surface of the outer circumferential cylindrical part 12 toward one side of a rotational direction of the rotating-side housing 20, and respective middle portions are reversed to form a U shape between the outer circumferential cylindrical part 12 and the inner circumferential cylindrical part 22 to be wound toward the other side of the rotational direction, and the respective other ends are fixed to the inner circumferential cylindrical part 22.

As illustrated in FIG. 4, the plurality of flat cables 30 comprise first to fourth flat cables 31, 32, 33, 34 (hereinafter, referred to as 31 to 34). The first to fourth flat cables 31 to 34 are formed into belt shapes by covering a plurality of conductors 31a, 32a, 33a, and 34a (hereinafter, referred to as 31a to 34a) disposed at intervals in the width direction with corresponding insulating materials 31b, 32b, 33b, and 34b (hereinafter, referred to as 31b to 34b).

Here, the first to fourth flat cables 31 to 34 accommodated in the accommodating space S are detachably stacked on the radially outer side in order of the first flat cable 31, the second flat cable 32, the third flat cable 33, and the fourth flat cable 34 from the outer circumferential cylindrical part 12 side toward the inner circumferential cylindrical part 22 side. Additionally, the first to fourth flat cables 31 to 34 accommodated in the accommodating space S are detachably stacked on the radially inner side in order of the first flat cable 31, the second flat cable 32, the third flat cable 33, and the fourth flat cable 34 from the inner circumferential cylindrical part 22 side toward the outer circumferential cylindrical part 12 side. Furthermore, as illustrated in FIG. 3, in the first to fourth flat cables 31 to 34 accommodated in the accommodating space S, the respective middle portions are formed with U-turn portions 31c, 32c, 33c, and 34c (hereinafter, referred to as 31c to 34c) that move in association with the rotation of the rotating-side housing 20 relative to the fixed-side housing 10. Accordingly, in the case where the U-turn portions 31c to 34c are located at center portions in the longitudinal direction of the respective first to fourth flat cables 31 to 34, this allows the rotating-side housing 20 to rotate relative to the fixed-side housing 10 by the same angle in each of one direction and the other direction.

A shield film 35 having a property of blocking and absorbing electromagnetic waves is disposed between, among the first to fourth flat cables 31 to 34, at least the first flat cable 31 including first and second communication circuit conductors (which will be described later) as target conductors and the second flat cable 32 adjacent to the first flat cable 31, to suppress the influence of the electromagnetic waves on the first and second communication circuit conductors. Here, the first and second communication circuit conductors serving as the target conductors are conductors used as differential transmission lines.

The shield film 35 may be disposed each between the plurality of flat cables 30. In the present embodiment, the shield film 35 is disposed only between the first flat cable 31 including the communication circuit conductors and the second flat cables 32.

It is only required that the shield film 35 disposed between the first flat cable 31 and the second flat cable 32 is formed integrally with any one of the first flat cable 31 and the second flat cable 32. In the present embodiment, the shield film 35 is formed integrally with the first flat cable 31.

Here, the first flat cable 31 on which the shield film 35 is formed will be described in detail.

The first flat cable 31 includes, as a plurality of conductors 31a, first to fourth conductive circuit conductors 31a1, 31a2, 31a3, and 31a4 (hereinafter, referred to as 31a1 to 31a4), first and second communication circuit conductors 31a5 and 31a6, and first and second ground conductors 31a7 and 31a8. As illustrated in FIG. 5, in the first flat cable 31, the first conductive circuit conductor 31a1, the first ground conductor 31a7, the first communication circuit conductor 31a5, the second communication circuit conductor 31a6, the second ground conductor 31a8, the second conductive circuit conductor 31a2, the third conductive circuit conductor 31a3, and the fourth conductive circuit conductor 31a4 are disposed at intervals in this order from the left end toward the right end in the width direction. Here, the first flat cable 31 has a high-speed communication GSSG structure in which the first and second ground conductors 31a7 and 31a8 are disposed on the outer sides in the width direction of the first and second communication circuit conductors 31a5 and 31a6, respectively.

The first to fourth conductive circuit conductors 31a1 to 31a4 are each formed into a rectangular cross-sectional shape having a width-directional dimension of 0.8 mm or more and a thickness-directional dimension of 35 μm. The first and second communication circuit conductors 31a5 and 31a6 and the first and second ground conductors 31a7 and 31a8 are each formed into a rectangular cross-sectional shape having a width-directional dimension of 0.1 mm and a thickness-directional dimension of 35 μm.

The first and second communication circuit conductors 31a5 and 31a6 and the first and second ground conductors 31a7 and 31a8 are disposed so that each of a distance between the first ground conductor 31a7 and the first communication circuit conductor 31a5, a distance between the first communication circuit conductor 31a5 and the second communication circuit conductor 31a6, and a distance between the second communication circuit conductor 31a6 and the second ground conductor 31a8 is from 0.4 mm or more and 1 mm or less.

In the plurality of conductors 31a in the first flat cable 31, one surface (a surface opposite to a surface facing the second flat cable 32) side is covered by a first insulating layer 31b1. The first insulating layer 31b1 includes a resin film 31b2 such as polyethylene terephthalate (PET) having a thickness dimension of 12 μm and an adhesive layer 31b3 having a thickness dimension of 20 μm.

Additionally, in the plurality of conductors 31a in the first flat cable 31, the other surface (a surface facing the second flat cable) side is covered by a second insulating layer 31b4. The second insulating layer 31b4 includes a resin film 31b5 having a thickness dimension of 25 μm and an adhesive layer 31b6 having a thickness dimension of 20 μm.

Furthermore, the shield film 35 is disposed on an outer surface (a surface facing the second flat cable 32) of the second insulating layer 31b4 in the first flat cable 31.

The shield film 35 includes a resin film 35a such as polyethylene terephthalate (PET) having a thickness dimension of 9 μm, a silver film 35b having a thickness dimension of 0.2 μm which is vapor-deposited on the resin film 35a, and an adhesive layer 35c having a thickness dimension of 20 μm. It is only required that the silver film 35b is disposed in the same size as a gap between the first and second ground conductors 31a7 and 31a8 in the width direction of the first flat cable 31, and has a width dimension which makes it possible to cover the entirety of at least the first and second communication circuit conductors 31a5 and 31a6 from the second flat cable 32 side.

In the first flat cable 31, the distance between the first and second communication circuit conductors 31a5 and 31a6, the distances between the first and second communication circuit conductors 31a5 and 31a6 and the first and second ground conductors 31a7 and 31a8, and the distance between the first and second communication circuit conductors 31a5 and 31a6 and the silver film 35b are set so that the characteristic impedance of the first and second communication circuit conductors 31a5 and 31a6 are within a range of from 90Ω to 110Ω.

In the rotating connector device 1 configured as described above, the plurality of flat cables 30 are accommodated in the accommodating space S in which the number of stacked layers of the flat cables 30 is different in each portion. For example, when the position in the rotational direction of the rotating-side housing 20 with respect to the fixed-side housing 10 is the middle position between an end on one direction side and an end on the other direction side, the number of stacked layers is four in a portion a in FIG. 3. However, since a position b in FIG. 3 is located on the radially inner side of the accommodating space S with respect to the portion a and a winding radius of the plurality of flat cables 30 in the position b is smaller than that in the portion a, a part of the plurality of flat cables 30 is wound one or more turns in the portion b, and therefore the number of stacked layers is six in the portion b. Furthermore, a portion c in FIG. 3 is a U-turn portion 31c of the first flat cable 31, and the number of stacked layers is one.

The number of stacked layers of the first to fourth flat cables 31 to 34 in the accommodating space S changes depending on the rotational position of the rotating-side housing 20 with respect to the fixed-side housing 10 at each portion. For example, in FIG. 3, when the rotating-side housing 20 is rotated clockwise relative to the fixed-side housing 10, the number of stacked layers of the flat cables wound on the radially outer side changes in the increasing direction. The number of stacked layers of the flat cables wound on the radially inner side changes in the decreasing direction. Furthermore, a portion between one end and the other end of each of the first to fourth flat cables 31 to 34 where the number of stacked layers is one moves clockwise in the accommodating space S.

The characteristic impedance of the first and second communication circuit conductors 31a5 and 31a6 in the first flat cable 31 changes with changes in inductance and capacitance. When the rotating-side housing 20 rotates relative to the fixed-side housing 10, the second to fourth flat cables 32, 33, and 34 move toward and away from the first flat cable 31, which causes changes in the inductance and capacitance of the first and second communication circuit conductors 31a5 and 31a6, but the shield film 35 provided to the first flat cable 31 makes it possible to suppress the influence of the electromagnetic waves of the second to fourth flat cables 32, 33 and 34 on the first flat cable 31, which makes it possible to stabilize the characteristic impedance of the first and second communication circuit conductors 31a5 and 31a6.

Now, as the test verifying the effect of the shield film 35, there will be described a result of the characteristic impedance of the first and second communication circuit conductors 31a5 and 31a6 measured in each of the case of only the first flat cable 31 and the case of stacking the second to fourth flat cables 32, 33 and 34 on the first flat cable 31.

The characteristic impedance of the first and second communication circuit conductors 31a5 and 31a6 was decreased by 2Ω in each of the case of only the first flat cable 31 and in the case of stacking the second to fourth flat cables 32, 33 and 34 on the first flat cable 31.

On the other hand, when the shield film 35 was removed from the first flat cable 31, the characteristic impedance of the first and second communication circuit conductors 31a5 and 31a6 was decreased by 41Ω in each of the case of only the first flat cable 31 and in the case of stacking the second to fourth flat cables 32, 33 and 34 on the first flat cable 31.

That is, the shield film 35 disposed between the first flat cable 31 and the second flat cable 32 makes it possible to suppress the influence of the electromagnetic waves of the second to fourth flat cables 32, 33, and 34 on the first and second communication circuit conductors 31a5 and 31a6, which makes it possible to stabilize the characteristic impedance of the first and second communication circuit conductors 31a5 and 31a6.

Thus, the rotating connector device 1 of the present embodiment comprises the fixed-side housing 10, the rotating-side housing 20 which is rotatable relative to the fixed-side housing 10, and the plurality of flat cables 30 which are each formed by covering conductors with an insulating material and which are accommodated in the stacked state in the annular accommodating space S formed between the fixed-side housing 10 and the rotating-side housing 20, wherein the shield film 35 is disposed between at least the first flat cable 31 including the first and second communication circuit conductors 31a5 and 31a6 and the second flat cable 32 adjacent to the first flat cable 31 that are selected from the plurality of flat cables 30.

Thus, the shield film 35 makes it possible to stabilize the characteristic impedance of the first and second communication circuit conductors 31a5 and 31a6 even when the number of stacked layers of the plurality of flat cables 30 changes in the accommodating space S, which makes it possible to suppress an increase in the size of the device, and to improve the electromagnetic compatibility and stabilize the characteristic impedance. Here, the electromagnetic compatibility refers to the property in which electromagnetic interference waves emitted from a target electric apparatus do not affect the other electric apparatuses and the target electric apparatus is not affected by electromagnetic interference waves emitted from the other electric apparatuses.

The shield film 35 is preferably formed integrally with the first flat cable 31 including the first and second communication circuit conductors 31a5 and 31a6.

Thus, the first flat cable 31 and the shield film 35 can be a single component, which makes it possible to reduce the number of components and reduce assembling man-hours.

The shield film 35 is preferably disposed on a portion in the width direction of the first flat cable 31, where at least the first and second communication circuit conductors 31a5 and 31a6 are located.

This can reliably suppress the influence of the electromagnetic waves of the second to fourth flat cables 32, 33, and 34 on the first and second communication circuit conductors 31a5 and 31a6.

The shield film 35 is preferably formed by vapor deposition of silver on the resin film 35a.

This makes it possible to reduce the thickness dimension of the silver film 35b, which makes it possible to reduce the thickness dimension of the entirety of the shield film 35 and to suppress an increase in the size in the thickness direction of the first flat cable 31.

Second Embodiment

Figure 6:
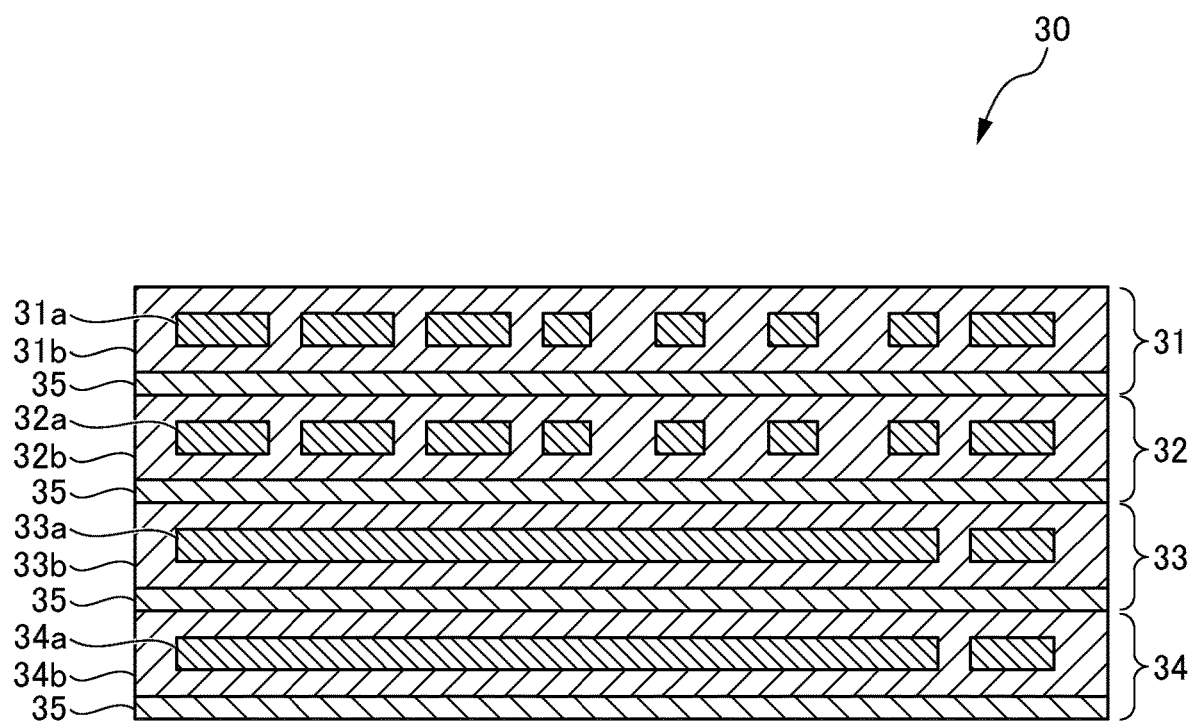
FIG. 6 is a cross-sectional view of first to fourth flat cables according to a second embodiment of the present invention.

FIG. 6 is a cross-sectional view of first to fourth flat cables according to a second embodiment of the present invention. Note that the same components as those of the above-described embodiment are denoted by the same reference numerals.

In a rotating connector device 1 of the present embodiment, a shield film 35 is provided on one surface of each of first to fourth flat cables 31 and 34.

In the rotating connector device 1 configured as described above, conductors 32a and 33a in the respective second and third flat cables 32 and 33 among the stacked first to fourth flat cables 31 to 34 are each disposed between the shield films 35 on both sides in the stacking direction.

This can suppress the influence of the electromagnetic waves on the conductors 32a and 33a in the respective second and third flat cables 32 and 33.

Thus, according to the rotating connector device 1 of the present embodiment, the shield film 35 makes it possible to stabilize the characteristic impedance of the first and second communication circuit conductors 31a5 and 31a6 in the same manner as in the first embodiment even when the number of stacked layers of the plurality of flat cables 30 changes in the accommodating space S, which makes it possible to suppress an increase in the size of the device, and to improve the electromagnetic compatibility and stabilize the characteristic impedance.

Furthermore, the shield film 35 is preferably formed integrally with one surface of each of the plurality of flat cables 30.

This makes it possible to improve the effect of suppressing the influence of electromagnetic waves on the conductors 32a and 33a each disposed between the shield films 35 on both sides in the stacking direction of the plurality of flat cables 30, and further improve the electromagnetic compatibility and stabilize the characteristic impedance.

Note that the above-described embodiment has described a case where the rotating connector device of the present invention is applied to a steering roll connector, but the present invention is not limited thereto. The rotating connector device of the present invention is also applicable to a rotation mechanism such as a joint portion of a robot arm. The rotating connector device of the present invention comprises a fixed-side member, a rotational movement-side member that moves while rotating relative to the fixed-side member, a plurality of flat cables which have respective one ends connected to the fixed-side member and the respective other ends connected to the rotational movement-side and which are wound around the rotational movement-side member, and therefore, can be applied to, for example, a sliding seat and a sliding door of a vehicle that require transmission of signals and electric power between the fixed-side member and the rotational movement-side member.

The above-described embodiment has described the shield film in which a silver film is formed by vapor deposition of sliver on the resin film, but the present invention is not limited thereto. The shield film may be any one that makes it possible to suppress the influence of electromagnetic waves on the conductors in the first flat cable 31, and may be obtained by forming, on the resin film, a copper film or an aluminum film, for example, instead of the silver film.

The above-described embodiment has described a case where the first and second communication circuit conductors 31a5 and 31a6, which are target conductors, are disposed in the first flat cable 31 located at end in the stacking direction of the flat cables 30, the target conductors being subjected to suppression of the influence of the electromagnetic waves, but the present invention is not limited thereto. The target conductors to be subjected to suppression of the influence of the electromagnetic waves are not necessarily disposed in the flat cable located at the end in the stacking direction, and the present invention is applicable also in the case where the target conductors are disposed in a flat cable located in a middle portion in the stacking direction of three or more flat cables. In this case, it is only required that a shield film is disposed between the flat cable located in the middle portion in which the target conductors are disposed and each of the flat cables adjacent on both sides of the flat cable located in the middle portion.

EXPLANATION OF REFERENCE NUMERALS

1: Rotating connector device
10: Fixed-side housing
20: Rotating-side housing
30: Flat cable
31: First flat cable
31a: Conductor
31a5: First communication circuit conductor 31a6: Second communication circuit conductor
32: Second flat cable
32a: Conductor
33: Third flat cable
33a: Conductor
34: Fourth flat cable
34a: Conductor
35: Shield film
35a: Resin film
S: Accommodating space

The invention claimed is:

1. A rotating connector device, comprising:
a fixed-side member;
a rotating-side member which is rotatable relative to the fixed-side member; and
a plurality of flat cables which are each formed by covering conductors with an insulating material and which are accommodated in a stacked state in an annular accommodating space formed between the fixed-side member and the rotating-side member,
wherein a shield film is disposed between at least a flat cable including target conductors and a flat cable adjacent to the flat cable including the target conductors that are selected from the plurality of flat cables, and
the shield film is disposed on a portion in a width direction of the flat cable including the target conductors, the portion being where at least the target conductors are located.

2. The rotating connector device according to claim 1, wherein the shield film is formed integrally with the flat cable including the target conductors.

3. A rotating connector device, comprising:
a fixed-side member;
a rotating-side member which is rotatable relative to the fixed-side member; and
a plurality of flat cables which are each formed by covering conductors with an insulating material and which are accommodated in a stacked state in an annular accommodating space formed between the fixed-side member and the rotating-side member,
wherein a shield film is disposed between at least a flat cable including target conductors and a flat cable adjacent to the flat cable including the target conductors that are selected from the plurality of flat cables, and
the shield film is formed integrally with one surface of each of the plurality of flat cables.

4. The rotating connector device according to claim 3, wherein the shield film is formed integrally with the flat cable including the target conductors.

5. A rotating connector device, comprising:
a fixed-side member;
a rotating-side member which is rotatable relative to the fixed-side member; and
a plurality of flat cables which are each formed by covering conductors with an insulating material and which are accommodated in a stacked state in an annular accommodating space formed between the fixed-side member and the rotating-side member,
wherein a shield film is disposed between at least a flat cable including target conductors and a flat cable adjacent to the flat cable including the target conductors that are selected from the plurality of flat cables, and
the shield film is formed by vapor deposition of silver on a resin film.

6. The rotating connector device according to claim 5, wherein the shield film is formed integrally with the flat cable including the target conductors.

7. A rotating connector device, comprising:
a fixed-side member;
a rotating-side member which is rotatable relative to the fixed-side member; and
a plurality of flat cables which are each formed by covering conductors with an insulating material and which are accommodated in a stacked state in an annular accommodating space formed between the fixed-side member and the rotating-side member,
wherein a shield film is disposed between at least a flat cable including a communication circuit conductor and a flat cable adjacent to the flat cable including the communication circuit conductor that are selected from the plurality of flat cables, and
the communication circuit conductor is formed as a part of a communication circuit that transmits electrical signals for high-speed communication, and formed with a width-directional dimension smaller than that of a conductive circuit conductor that forms a part of a conductive circuit that transmits electric power.

* * * * *